United States Patent Office 3,502,675
Patented Mar. 24, 1970

3,502,675
5,6-SUBSTITUTED DIHYDROPYRIMIDINES
Robert Duschinsky, Montclair, and Max Hoffer, Nutley N.J., assignors to Hoffmann-La Roche Inc., Nutley, N.J., a corporation of New Jersey
No Drawing. Filed June 20, 1966, Ser. No. 558,553
Int. Cl. C07d 51/30
U.S. Cl. 260—260       2 Claims

ABSTRACT OF THE DISCLOSURE 5-bromo-5-nitro-6-lower alkoxy hydrouracils and 5-bromo-5-trifluoromethyl-6-lower hydroxy hydrouracils are prepared inter alia by treating 5-nitrouracil or 5-($\alpha,\alpha,\alpha$-trifluoromethyl)uracil with a lower alkyl ester of hydrobromic acid. The compounds are useful as anti-bacterial/anti-fungal agents.

---

This invention relates to 5,6-substituted dihydropyrimidines. More particularly, the invention relates to novel pyrimidines of the formula

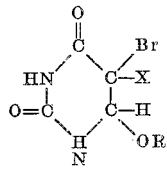

(I)

wherein X is nitro or trifluoromethyl and R is lower alkyl.

The term "lower alkyl" as used herein represents a straight or branched chain hydrocarbon containing from 1 to 7 carbon atoms such as methyl, ethyl, propyl, isopropyl, butyl, isobutyl and the like.

The compounds of this invention can be prepared conveniently by any one of several alternatives. For example, they can be prepared by reacting the starting base, i.e., 5-nitrouracil or 5-($\alpha,\alpha,\alpha$-trifluoromethyl)uracil, with a lower alkyl ester of hypobromic acid. Alternatively, such compounds can be prepared by reacting the starting base with bromine and a suitable monohydric alcohol, i.e., a monohydric lower alkanol. In the first method, one can use, for example, ethyl hypobromite or butyl hypobromite, etc., as the hypobromic acid alkyl ester reactant.

In the second method there is employed bromine and a lower alkyl monohydric alcohol having a chain length of from 1 to 7 carbon atoms as the alcohol reactant. Lower alkanols which are well suited for use in this method are, for example, methanol, ethanol, propanol, isopropanol, butanol, isobutanol, etc. The reaction with bromine or alkanol can be conveniently carried out by treating with bromine a suspension of the appropriate base in the desired lower alkanol, preferably in the presence of an acid binding agent such as potassium carbonate, sodium carbonate, silver carbonate, etc. which will bind the free hydrogen bromide formed in the reaction. The reaction temperature employed in either of the preparative methods described above is not critical and either reaction, i.e., the reaction with the lower alkyl ester of hypobromic acid or the reaction with bromine and a lower alkanol, can be conveniently carried out at room temperature though higher or lower temperatures, preferably a temperature within the range of about 0° to about 100° C., are suitably employed.

The novel compounds of this invention, i.e., the compounds of Formula I, are useful as germicidal agents and anti-fungal agents being active, for example, against a variety of bacteria, yeasts, mold and fungi. More particularly, the novel compounds of this invention have been shown to possess broad spectrum anti-bacterial and anti-fungal activity. They are active against a wide variety of Bram-positive and Gram-negative bacteria, fungi, protozoa, molds and yeast. For example, they can be used to inhibit the growth of bacteria such as *Staphylococcus aureus, Streptococcus hemolyticus, Pseudomonas aeruginosa, Proteus vulgaris, Bacillus simplex*, etc. The compound 5-bromo-5-nitro-6-methoxyhydrouracil has been found to possess an especially broad spectrum anti-microbial activity, possessing a high degree of activity against, among others, the following organisms: *Escherichia coli, Diplococcus pneumoniae, Salmonella thypi, Staphylococcus aureus, Streptococcus hemolyticus, Pseudomonas aeruginosa, Proteus vulgaris, Candida albicans, Microsporum audouini, Trichophyton mentagrophytes, Trichomonas vaginalis, Endamoeba histolytica, Aspergillus niger, Aspergillus oryzae, Bacillus simplex, Actinomyces cellulosae, Paecilomyces varioti and Saccharomyces cerevisiae.*

In view of their broad spectrum anti-microbial activities, the novel compounds of this invention are particularly well suited for such uses as contact disinfectants or as additives for the preservation of materials subject to microbial deterioration such as, for example, various medicaments, paints, powders, varnishes, plastics, furs, leather, cutting oils, ointments, cosmetics, etc. They can also be used as the active ingredients of various topical anti-microbial compositions useful in the treatment of microbial diseases.

As indicated the novel compounds of this invention can be effectively used in preventing or arresting the growth of microorganisms by application to the microorganism habitat. The compounds can be suitably employed in solution either in water or in an organic solvent in both aqueous and nonaqueous suspensions such as lotions, ointments, creams or pastes or in suspension or solution in a paint, varnish or oil, etc. The compounds can also be used in dry form in a dusting powder or in any other way that antiseptics and preservatives are generally employed. The predominant process employing the compounds as antiseptics, however, is one involving aqueous systems such as, for example, when the compounds are employed in aqueous emulsions to preserve machine cutting oils and the like.

This invention will be more fully understood from the specific examples which follow.

EXAMPLE 1

Preparation of 5-bromo-5-nitro-6-methoxyhydrouracil 5-nitrouracil, 31.4 g. (0.2 mole), suspended in methanol, 3 l., and bromine, 32 g., 0.4 mole, 10 ml., were stirred for 15 minutes. A slurry of silver carbonate, 30 g. in methanol, was added and stirring was continued for 12 hours. After filtering from the silver salts the solution was evaporated in vacuo and the residue recrystallized from water or ethyl acetate ligroin. The compound melted at 200–203° with decomposition. The decomposition products were predominately 5-nitrouracil and decomposition products of methyl hypobromite.

EXAMPLE 2

Preparation of 5-bromo-5-nitro-6-ethoxyhydrouracil

Prepared in analogy to Example 1 by substituting the methanol with ethanol. The product was recrystallized from ethyl acetate-ligroin. Melting point, 200–202° with decomposition.

EXAMPLE 3

Preparation of 5-bromo-5-trifluoromethyl-6-methoxyhydrouracil

A solution of methyl hypobromite was prepared by the addition of 5.5 g. (20 mmoles) of silver carbonate to a solution of 1.6 g. (10 mmoles) of bromine in 20 ml. of methanol which had been cooled to −10° C. The resulting suspension was stirred at −10° C. for 30 minutes, then filtered rapidly into a solution of 0.72 g. (4 mmoles) of 5-trifluoromethyluracil in 15 ml. of methanol previously cooled in an ice bath. After 1 hr. in the ice bath, examination of the reaction mixture by ultraviolet spectrophotometry in methanol showed no maximum in the ultraviolet spectrum at wavelengths greater than 240 mµ.

The somewhat opaque solution was filtered twice through Celite for clarification and the filtrate evaporated to dryness in vacuo. After trituration with ether, the white solid was removed by filtration and washed with ether and petroleum ether. The crude 5-bromo-5-trifluoromethyl-6-methoxyhydrouracil thus isolated melted at 239–240° C. with gas evolution. Recrystallization from 6 ml. of n-butyl-acetate gave pure 5-bromo-5-trifluoromethyl-6-methoxyhydrouracil melting at 246–248° C.

$$\lambda_{max.}^{MeOH} = 274 \text{ m}\mu, \epsilon = 5500$$

EXAMPLE 4

5-bromo-5-nitro-6-methoxyhydrouracil

*Oil paint formulation.*—An oil paint having the composition set forth below was made by intimately blending in a conventional manner oil, varnish and pigments and adding to the resulting paste, driers, solvents and water.

| | Lbs. |
|---|---|
| 5-bromo-5-nitro-6-methoxyhydrouracil | 8.153 |
| Iron oxide pigment | 1498 |
| Amorphous silica | 888 |
| Asbestine | 1476 |
| Spar varnish (60 percent N.V.) | 1180 |
| Linseed oil, Q bodied | 2888 |
| Mineral spirits | 526 |
| Water | 88 |
| Co drier (6 percent) | 28 |
| Pb drier (24 percent) | 70 |
| Mn drier 6 (percent) | 11 |
| Total weight | 8761.153 |

O/W all-purpose cream (A)

| | Percent |
|---|---|
| Stearic acid | 10 |
| Lanolin | 4 |
| Beeswax | 2 |
| Mineral oil | 20 |
| Tween 40 [1] | 5 |
| Atlas G-1706 beeswax derivative [2] | 2 |

[1] Atlas Polyoxyethylene sorbitan monopalmitate.
[2] Polyoxyethylene sorbitol beeswax derivative.

(B)

| | |
|---|---|
| Sorbo [3] | 12 |
| Water | 42 |
| 5-bromo-5-nitro-6-methoxyhydrouracil | 0.05 |

[3] 70 percent aqueous solution of D-sorbitol (Atlas).

(C)

Perfume q.s.

The ingredients in Part A were put into a suitable glass lined kettle and were heated to 70° C. The ingredients in Part B were heated to 72° C. in a separate kettle. Part B was then added to Part A with agitation. Perfume was heated at 50° C. and material was poured into jars.

What is claimed is:
1. A compound of the formula

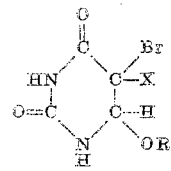

wherein X is trifluoromethyl and R is lower alkyl.

2. The compound according to claim 1 wherein R is methyl, i.e., the compound 5-bromo-5-trifluoromethyl-6-methoxyhydrouracil.

References Cited

FOREIGN PATENTS 6404756  11/1964  Netherlands.

OTHER REFERENCES

Johnson, Treat B.: Chemical Abstracts, vol. 2, 2792–2793, (1908).

Yale, Harry L.: Journal of Medicinal and Pharmaceutical Chemistry, vol. 1, No. 2 (1950), pp. 121–133.

ALEX MAZEL, Primary Examiner

ANNE MARIE T. TIGHE, Assistant Examiner

U.S. Cl. X.R.

106—18; 424—251